United States Patent [19]

Hattori et al.

[11] Patent Number: 4,636,884

[45] Date of Patent: Jan. 13, 1987

[54] HEAD POSITIONING CONTROL SYSTEM IN MAGNETIC DISK DEVICE OF INDEX SERVO SYSTEM

[75] Inventors: Masakatsu Hattori; Masao Fujiki, both of Tokyo, Japan

[73] Assignee: Kabushiki Kaisha Toshiba, Kawasaki, Japan

[21] Appl. No.: 800,317

[22] Filed: Nov. 21, 1985

[30] Foreign Application Priority Data

Nov. 30, 1984 [JP] Japan ................................. 59-253021

[51] Int. Cl.$^4$ ............................................. G11B 5/55
[52] U.S. Cl. ...................................................... 360/78
[58] Field of Search ........................................ 360/78

[56] References Cited

PUBLICATIONS

IBM Technical Disclosure Bulletin, vol. 13, No. 11, Apr. 1971, pp. 3433-3434, Track Following and Seeking System, C. Walton.

*Primary Examiner*—George G. Stellar
*Attorney, Agent, or Firm*—Finnegan, Henderson, Farabow, Garrett & Dunner

[57] ABSTRACT

In the head positioning control system in the magnetic disk device of the index servo system of the invention, a position signal representing the position of the head on the disk, generated by a position signal generator, is converted by an A/D converter into a digital signal. Based on the digital signal, a CPU determines positioning correction data. The CPU stores positioning correction data in a memory, converts it into an analog signal by a D/A converter, and drives a stepping motor through a distributor and a magnetizing circuit so as to correct the position of the magnetic head. If, when the next seek operation is performed, the seek track number to a target track is less than a predetermined value, the difference between the track determined in a previous seek operation and a current track is less than a predetermined value, and the number of previous seek operations without servo data is less than a predetermined value, the CPU will read out the positioning correction data, used in a seek operation, from the memory and position the head. When the above-mentioned three conditions are not satisfied, the head is positioned using servo data read out from the disk.

6 Claims, 15 Drawing Figures

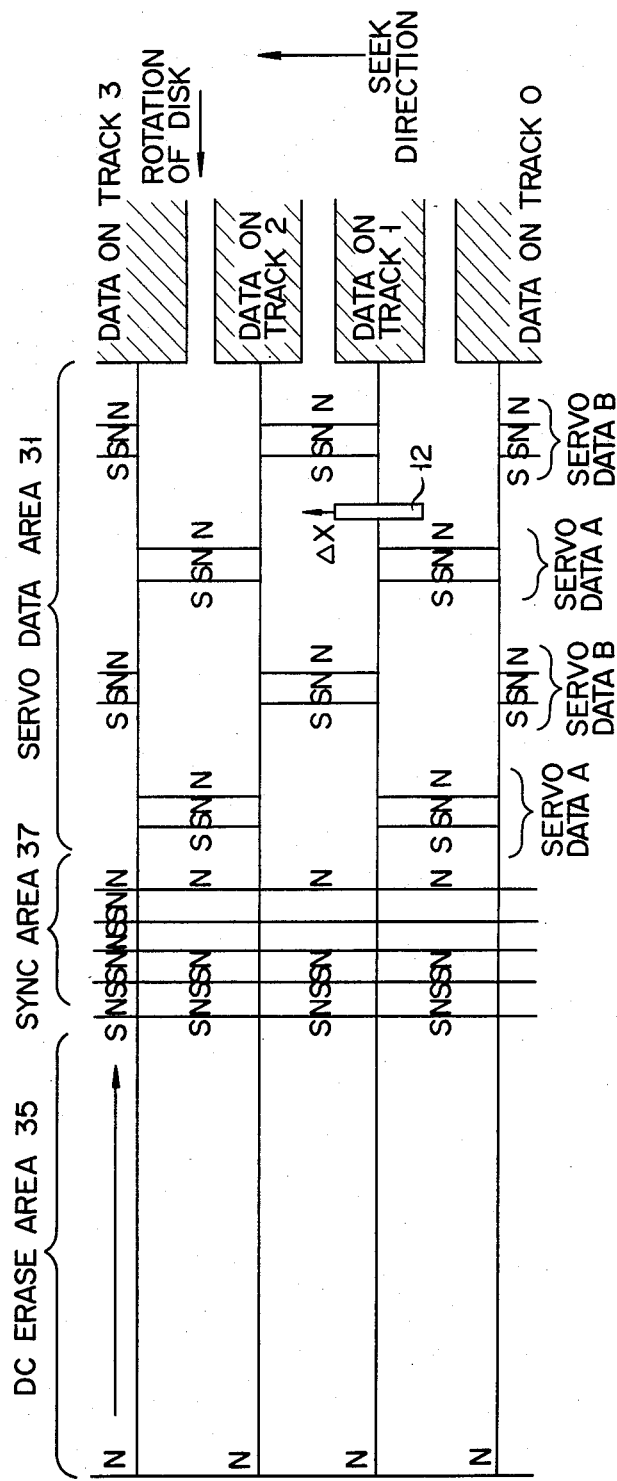

SERVO SIGNAL

PEAK-HOLD
TIMING SIGNAL

HEAD POSITIONING CONTROL SYSTEM IN MAGNETIC DISK DEVICE OF INDEX SERVO SYSTEM

BACKGROUND OF THE INVENTION

The present invention relates to a magnetic head control system in the magnetic disk device of an index servo system.

In a low-cost, compact, hard magnetic disk device (e.g., 5" hard disk, 610 tracks, 25-Mbyte capacity, 15-kbpi), a stepping motor is often used as a drive source for executing the magnetic head's seek operation. Positioning control of a magnetic head by a stepping motor involves the problem of positional error due to low angle precision of the stepping motor, and changes in ambient temperature.

The former problem can be resolved by decreasing the track width in comparison with the track interval in order to prevent interference between adjacent tracks. Thus, errors in accessing an adjacent track are prevented by increasing the track interval. However, the latter problem cannot be resolved even if the track width is decreased, since the position of the magnetic head changes in read and write modes depending upon changes in ambient temperature. In view of this, a servo system has been adopted. In this system, servo data stored in a magnetic recording medium (to be referred to as a disk hereinafter) is used to improve positioning precision of the magnetic head in its seek operation.

Although various servo systems have been proposed, an index servo system is normally adopted in a magnetic disk device of this type. In the index servo system, servo data is recorded in part of a first sector of each disk track, and positioning control is performed upon each rotation of the disk.

In a seek operation according to the index servo system, the magnetic head is moved to a target track of the disk by a stepping motor. The magnetic head remains static until the positioning system stops oscillating. When the disk rotates again and a servo sector comes to the magnetic head position, the head reads servo data. The magnetic head is moved by the stepping motor in accordance with the movement control amount specified in the servo data. When the positioning system stops oscillating, the seek operation ends. The magnetic head is thus positioned on the target track to a high degree of precision.

However, in the index servo seek operation as described above, the seek operation is prolonged as compared to the case wherein a servo system is not adopted. When the seek operation is long, i.e., when the number of tracks to be jumped is large, the moving time to a target track itself is long and the time required for positioning is not a critical problem. However, in a short seek operation, the moving time to a target track may become shorter than the positioning time (i.e., time required for the magnetic head to be securely positioned on the target track; index servo data is read an average of three times in order to perform such positioning). In such a case, the ratio of positioning time to the overall average seek operation time (i.e., the average time required up to final positioning including moving time to the target track, irrespective of the number of tracks to be jumped) increases, and an improvement in this respect is desired.

SUMMARY OF THE INVENTION

It is an object of the present invention to provide a head positioning control system, in the magnetic disk device of an index servo system, which can reliably execute positioning of a magnetic head in an index servo system seek operation, and shorten the time required for finally positioning the head even in the case of a short seek operation.

According to the head positioning control system of the present invention, when the number of seek operations of a magnetic head is shorter than a preset value, the magnetic head is positioned in a non-servo data mode not using index servo data. When the number of seek operations performed in the non-servo data mode is larger than a preset value, the magnetic head is positioned in a servo data mode using index servo data.

In order to achieve the above object of the present invention, a magnetic head control system is provided in a magnetic head device of an index servo system, comprising:

a magnetic recording medium in which predetermined index servo data are prerecorded;

a stepping motor for driving the magnetic head in order to position the magnetic head on a target track on the magnetic recording medium;

drive signal generating means for generating a positioning coil current value in accordance with the index servo data and a step pulse of the stepping motor, determined in accordance with a seek operation of the magnetic head;

memory means for storing the positioning coil current value generated by the drive signal generating means;

first drive control means for driving, when at least a seek distance is shorter than a preset distance in the magnetic head's seek operation, the stepping motor in a non-servo data mode in which the positioning coil current value stored in the memory means and step pulses generated by the drive signal generating means are not used; and second drive control means for driving, when the number of seek operations in the non-servo data mode by the first drive control means exceeds a predetermined number of magnetic head's seek operations, the stepping motor in a servo mode in which both step pulses and coil current values generated by the drive signal generating means are used.

With the system of the above-mentioned configuration, when a seek distance is short, positioning is performed in the non-servo data mode and the seek operation time is shortened. When seek operations are consecutively performed in the non-servo data mode, positioning precision is gradually degraded. Therefore, after a predetermined number of seek operations, positioning is performed in the servo data mode even if the seek distance is short. Thus, the seek operation can be performed reliably without degrading positioning precision.

BRIEF DESCRIPTION OF THE DRAWINGS

Other objects and features of the present invention will be apparent from the following description, given in connection with the accompanying drawings in which:

FIG. 7 is a diagram showing an example of servo data used in the embodiment shown in FIG. 1;

FIGS. 10A and 10B are timing charts explaining the mode of operation of the embodiment shown in FIG. 1, in which FIG. 10A shows a servo signal and FIG. 10B shows a peak hold timing signal.

DETAILED DESCRIPTION OF THE PREFERRED EMBODIMENTS

Figure 1:
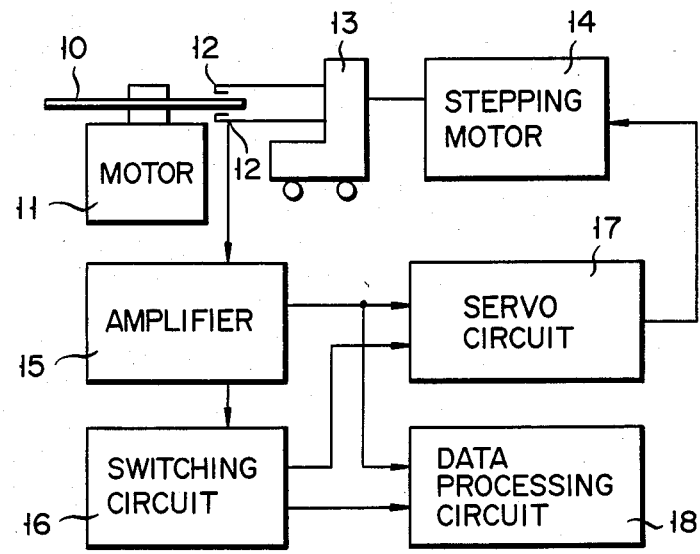
FIG. 1 is a block diagram showing the configuration of a magnetic disk device according to an embodiment of a magnetic head control system of the present invention.

Referring to FIG. 1, index servo data (to be referred to as servo data hereinafter) is prerecorded in a disk 10. The disk 10 is driven by a spindle motor 11 when a magnetic disk device is started. A magnetic head 12 is mounted on a carriage 13 and is moved on the disk 10 by the carriage 13. The carriage 13 is driven by a stepping motor 14.

Figure 2:
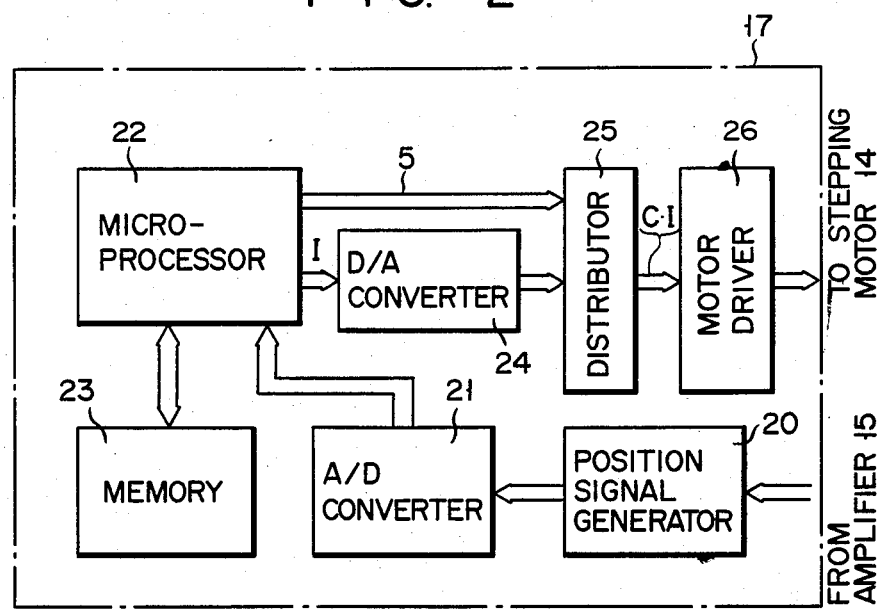
FIG. 2 is a block diagram showing the configuration of the servo circuit according to the embodiment shown in FIG. 1.

Data including servo data recorded on the disk 10 is read by the head 12 and amplified by an amplifier 15. When the data amplified by the amplifier 15 is servo data, a switching circuit 16 outputs the servo data from the amplifier 15 to a servo circuit 17. However, when the data from the amplifier 15 is normal data, i.e., not the servo data, the switching circuit 16 transfers the data from the amplifier 15 to a data processing circuit 18. The circuit 18 performs read processing of normal data such as digitization. The servo circuit 17 controls the drive operation of the stepping motor 14 so as to control the seek operation of the head 12. FIG. 2 shows details of the circuit 17.

Referring to FIG. 2, a position signal generator 20 generates a position signal from the servo signal from the amplifier 15 and supplies it to an A/D converter 21. The A/D converter 21 converts the received position signal into a digital signal and supplies it to a microprocessor (CPU) 22. The CPU 22 controls the circuit 17 based on a program stored in an internal ROM (not shown), and determines the positioning correction value of the stepping motor 14 from the position signal from the A/D converter 21. A memory 23 stores various data required for controlling the servo circuit 17 by the CPU 22.

The CPU 22 generates a step pulse S in accordance with a seek operation and data representing the seek direction and the correction value for positioning. A D/A converter 24 converts the correction data from the CPU 22 into an analog signal and supplies it to a distributor 25. The distributor 25 determines the coil magnetizing sequence of the motor 14 in accordance with the step pulse S and the seek direction signal from the CPU 22. In the positioning operation, the distributor 25 converts the analog signal from the D/A converter 24 into a control signal for adjusting the coil current to be supplied to the stepping motor 14.

Figure 4:
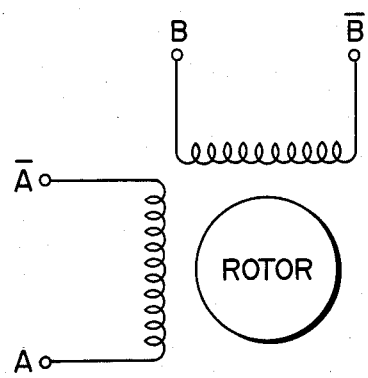
FIG. 4 is a diagram explaining the magnetization phase in a stepping motor.

A stepping motor driver 26 amplifies and switches a coil current to be supplied to the stepping motor 14, based on a current switching signal C supplied from the distributor 25. The stepping motor also drives a rotor by applying pulses in the two magnetization phases A and B as shown in FIG. 4. For example, the statuses of the drive voltage applied to the respective magnetization phases in the drive steps 1 to 4 are as follows:

TABLE I

|   | 1st step | 2nd step | 3rd step | 4th step |
|---|---|---|---|---|
| A | + | − | − | + |
| B | + | + | − | − |
| $\overline{A}$ | − | + | + | − |
| $\overline{B}$ | − | − | + | + |

Figure 5:
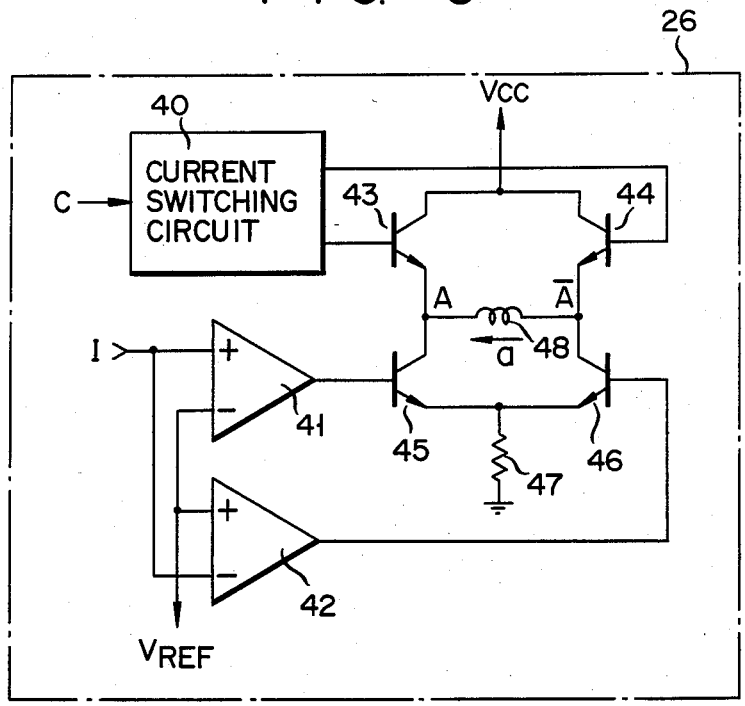
FIG. 5 is a block diagram showing the configuration of the stepping motor driver in the embodiment shown in FIG. 1.

FIG. 5 shows details of the stepping motor driver 26. For the sake of simplifying the diagram, FIG. 5 shows the stepping motor driver for only one phase (A, $\overline{A}$) between the two magnetization phases. Referring to FIG. 5, the stepping motor driver 26 comprises a current switching circuit 40, amplifiers 41 and 42, transistors 43 through 46, and a resistor 47. The circuit 40 controls the current direction of a coil 48 of the motor 14 in accordance with a current switching signal C from the distributor 25. The amplifiers 41 and 42 amplify a positioning correction signal I from the distributor 25 and supply a predetermined current to the coil 48.

When the operation given in Table I is performed, the signals of the stepping motor driver have the following relationships:

TABLE II

| 1st step | 2nd step | 3rd step | 4th step |
|---|---|---|---|
| Phase A | | | |
| Tr 43 ON | Tr 44 ON | Tr 44 ON | Tr 43 ON |
| Tr 46 ON | Tr 45 ON | Tr 45 ON | Tr 46 ON |
| I < VREF | I > VREF | I > VREF | I < VREF |
| Phase B | | | |
| Tr 43 ON | Tr 44 ON | Tr 44 ON | Tr 44 ON |
| Tr 46 ON | Tr 46 ON | Tr 45 ON | Tr 45 ON |
| I < VREF | I < VREF | I > VREF | I > VREF |

Figure 3:
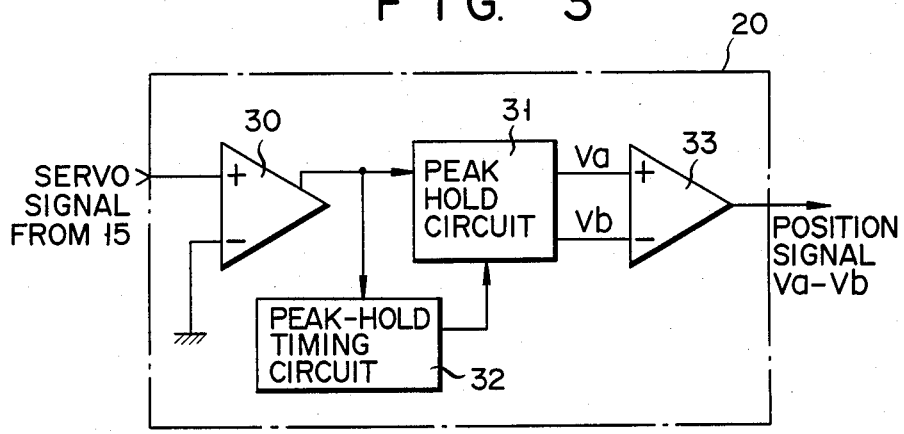
FIG. 3 is a block diagram showing the configuration of the positioning signal generation circuit in the embodiment shown in FIG. 1.

The position signal generator 20 shown in FIG. 2 comprises an amplifier 30, a peak hold circuit 31, a peak hold timing circuit 32, and a differential amplifier 33, as shown in FIG. 3. The amplifier 30 amplifies a servo signal received from the amplifier 15 in FIG. 1 and supplies the amplified signal to the circuits 31 and 32. The circuit 31 holds peaks Va and Vb of each signal voltage of the servo signal in synchronism with the timing signal from the circuit 32. The differential amplifier 33 calculates the difference between the output signals Va and Vb from the circuit 31 and generates a position signal (Va−Vb).

Figure 11A:
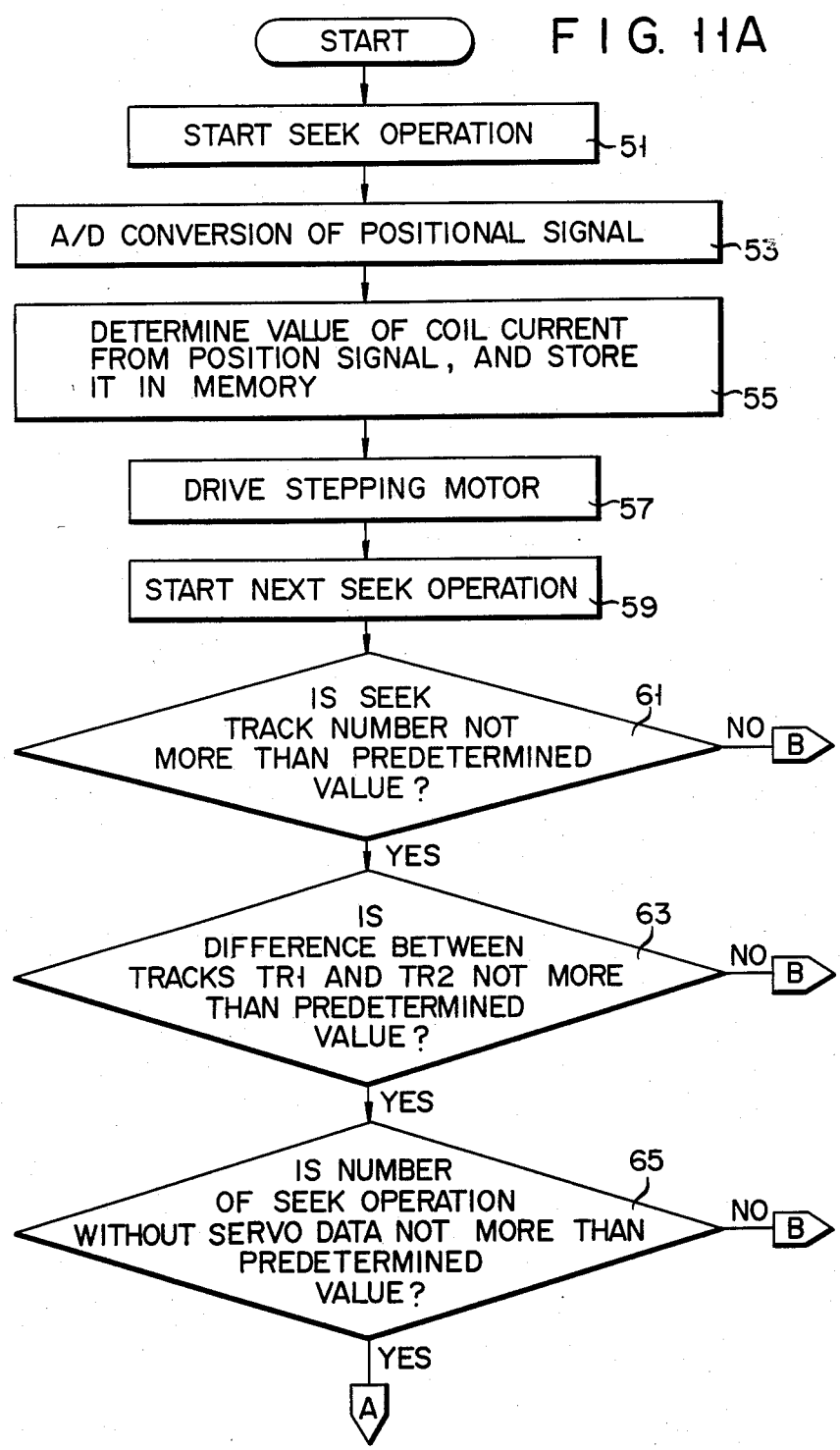
FIGS. 11A through 11C are timing charts explaining the mode of operation of the embodiment shown in FIG. 1.
Figure 11B:
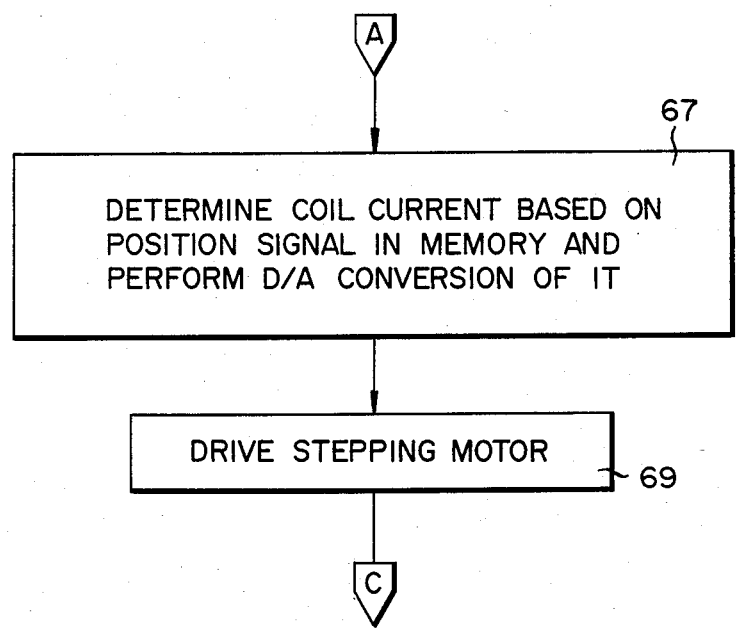
Figure 11C:
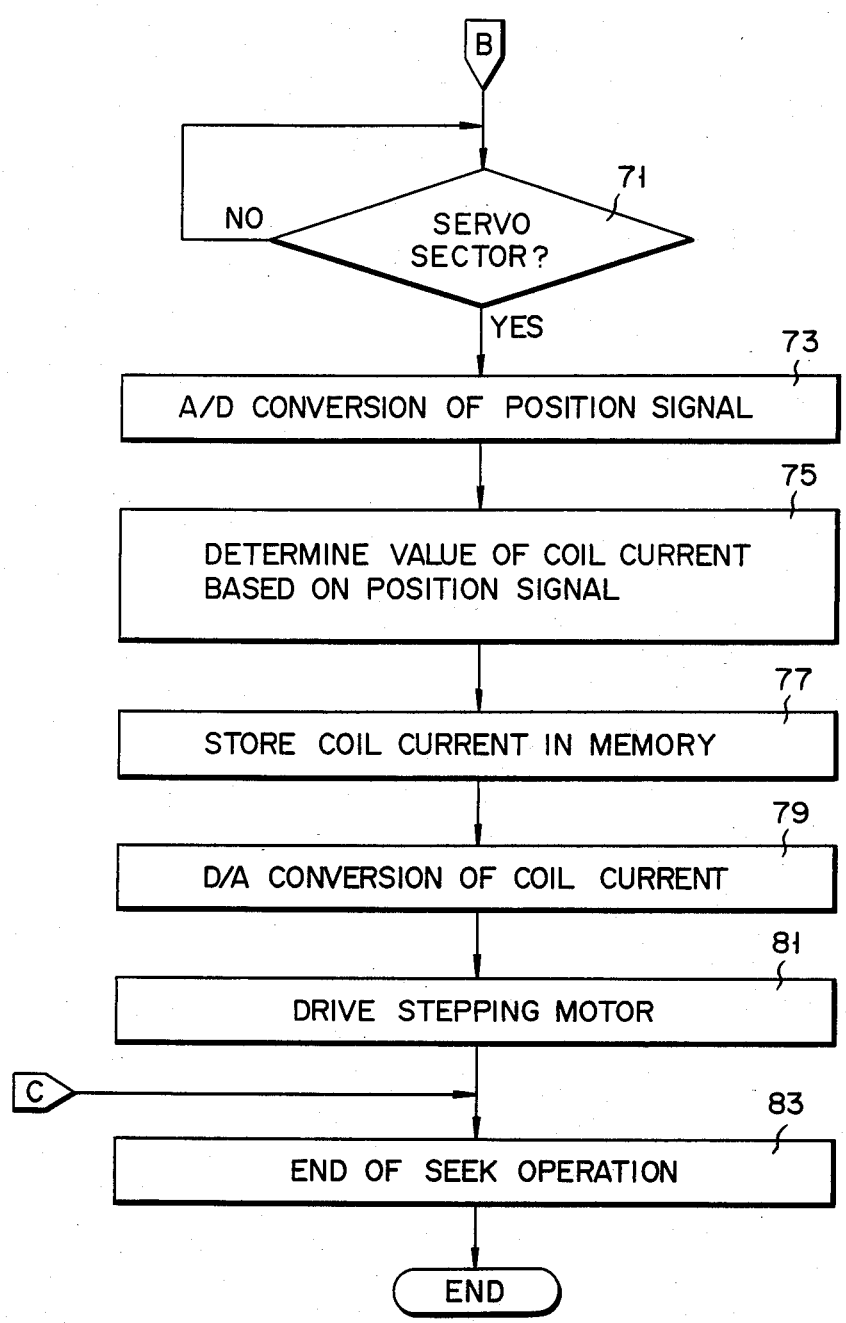

The mode of operation of the magnetic head control system according to the present invention and having the above-mentioned configuration will be described with reference to FIGS. 11A through 11C. In step 51, when a seek request signal is supplied from a host computer to the CPU 22, the seek operation is started. The CPU 22 supplies a step pulse S according to the seek distance (the number of tracks across which the head is to be moved) to the distributor 25. At the same time, the CPU 22 supplies a signal for determining the coil current of the motor 14 to the distributor 25 through the D/A converter 24. The distributor 25 supplies a control signal C for magnetization phase switching of the motor 14 to the driver 26. In response to this signal, the driver 26 is operated to drive the stepping motor 14. Then, the carriage 13, shown in FIG. 1, is driven by the motor 14 and the magnetic head 12 is moved to a target track position on the disk 10. At this time, the head 12 is moved at intervals of one track for each pulse S.

Figure 6A:
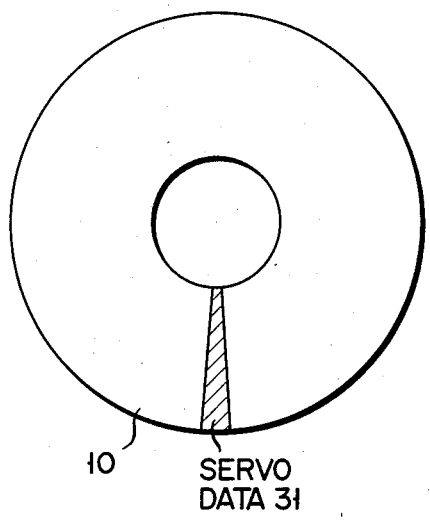
FIGS. 6A and 6B are diagrams showing the structure of the disk used in the embodiment in FIG. 1.
Figure 6B:
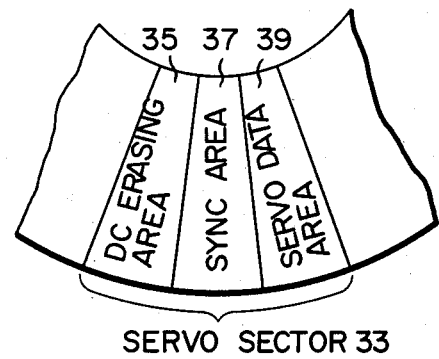

When generation of step pulses S from the CPU 22 ends, positioning of the head 12 on the target track starts. As shown in FIG. 6A, servo data 31 prerecorded on the disk 10 is read by the head 12, and is supplied to the generator 20 through the amplifier 15 shown in FIG. 1. The servo data 31 is stored in one location, i.e., a part of a first sector in each track of the disk 10. A servo sector 33 storing the servo data 31 has the format shown in FIG. 6B. In a current (DC) erasing area 35, the output from the magnetic head 12 is 0. The switching circuit 16 supplies an output signal (servo signal) from the amplifier 15 to the servo circuit 17. Sync data is stored in a SYNC area 37. A phase locked loop (PLL) circuit (not shown) of the peak-hold timing circuit 32 shown in FIG. 3 is synchronized with the data in the SYNC area 37, and a timing signal for performing peak hold of the servo data is prepared. Position data consisting of servo data A and B is recorded in a servo data area 39, as shown in FIG. 7. The servo data A and B, respectively, comprise patterns in which the period in the rotating direction of the disk 10 is equal, and which are shifted with each other in the seek direction. Position data is stored in the servo data area such that the servo data A and B are recorded alternately for each track along the seek direction. A boundary line between the servo data A and B coincides with the central line of each track recording normal data. Therefore, if servo data according to the characteristics of the motor 14 are recorded near the boundary line, the center of the head 12 is normally positioned at the center of each track.

Figure 8:
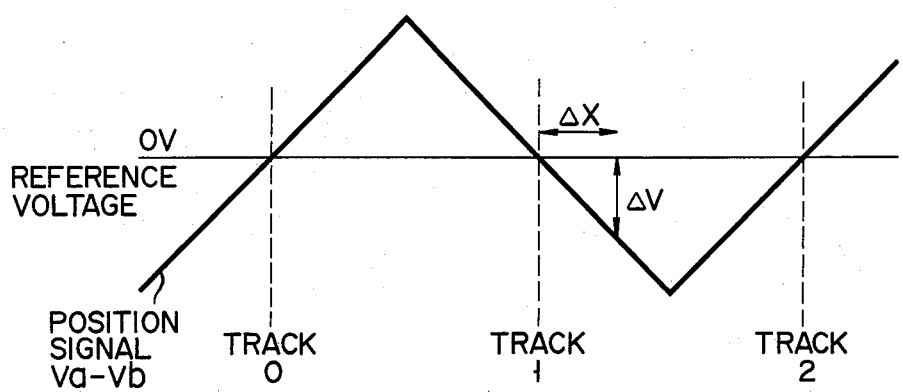
FIG. 8 is a waveform chart explaining the mode of operation of the embodiment shown in FIG. 1.
Figure 10A:
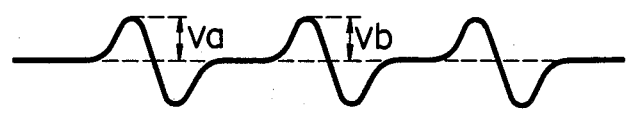
Figure 10B:
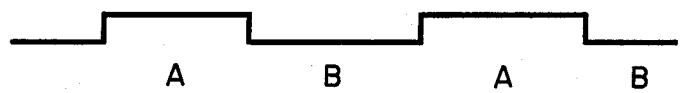

For example, when the head 12 is located at the position shown in FIG. 7, the servo signal from the head 12 has a waveform as shown in FIG. 10A. Referring to FIG. 10A, a servo signal voltage Va is an output signal by magnetization inversion of the servo data A, and a servo signal voltage Vb is an output signal by magnetization inversion of the servo data B. When the head 12 is located at the center of a track, the servo data Va and Vb become the same. The generator 20, shown in FIG. 3, holds the peaks of the servo signal voltages Va and Vb in synchronism with the peak hold timing signal shown in FIG. 10B. The differential amplifier 33 generates a position signal (Va−Vb), as shown in FIG. 8, in accordance with the peak-held servo signals Va and Vb.

The position signal prepared in this manner is converted into a digital signal by the A/D converter 21 shown in FIG. 2 (step 53). Based on the position signal of the digital signal, the CPU 22 determines the positioning correction data, i.e., the coil current of the stepping motor 14. The positioning correction data is stored in the memory 23 (step 55). The positioning correction data from the CPU 22 is supplied to the D/A converter 24, and an analog signal from the D/A converter 24 is supplied to the distributor 25. Based on the output signal from the D/A converter 24, the distributor 25 supplies a current switching signal C, representing a coil current I and its direction, to the stepping motor driver 26. The current switching circuit 40 of the driver 26 selectively operates one of the transistors 43 and 44 by the current switching signal C, as shown in FIG. 5. When the position signal (Va−Vb) is positive, the circuit 40 turns on the transistor 44. In this case, when the transistor 45 is turned on by the output from the amplifier 41, a current flows in the coil 48 in the direction a. On the other hand, when the position signal (Va−Vb) is negative, a current flows in the coil 48 in a direction opposite to the direction a. At this time, the current value is determined by the resistor 47. As in step 57, the stepping motor 14 is driven, and the carriage 13 is moved. The position of the magnetic head 12 is corrected by the carriage 13, and is positioned at substantially the center of a target track.

Figure 9:
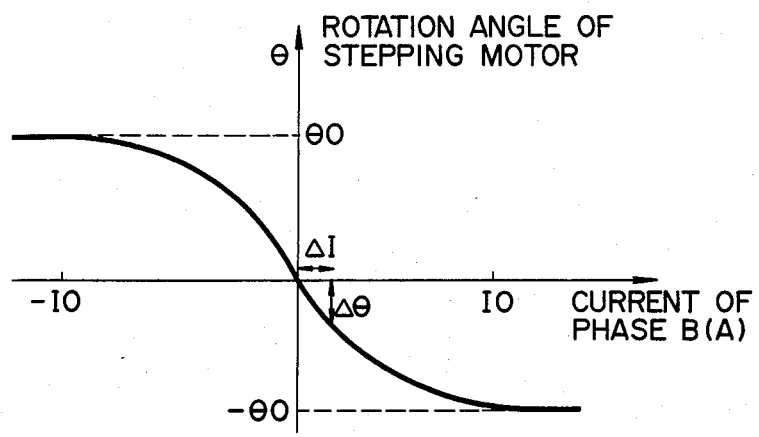
FIG. 9 is a graph showing the characteristics of a stepping motor for the purpose of explaining the mode of operation of the embodiment shown in FIG. 1.

FIG. 9 shows the relationship between the rotation angle and magnetization current of the motor 14. That is, the relationship between the current of phase B, when a current IO flows in the phase A, and the rotation angle of the stepping motor is illustrated. In the case of two-phase magnetization, when a constant current IO is supplied in phase A and no current is supplied in phase B, the rotation angle $\theta$ of the stepping motor 14 is 0 degrees. When the current supplied in phase B is increased, the rotation angle $\theta$ of the motor 14 increases shown in FIG. 8. When the head 12 is moved by $\Delta x$, as shown in FIG. 8, the position signal voltage becomes $\Delta V$ shown in FIG. 8. The position signal $\Delta V$ is supplied to the CPU 22 through the A/D converter 21. From the relationship between the magnetization current and rotation angle of the stepping motor 14, as shown in FIG. 9, the CPU 22 determines the coil current corresponding to the position signal $\Delta V$. The coil current is stored in the memory 23. When the motor 14 is rotated by $\Delta \theta$ upon supply of this current, the carriage 13 is linearly moved by $\Delta x$. Then, the magnetic head 12 is moved by a distance $\Delta x$ in a direction to eliminate the positioning error $\Delta x$, and is then positioned on the target track.

Assume that the next seek operation is started as in step 59. At this time, the head 12 is moved to the position of a target track in accordance with the above-mentioned operation. When positioning is started, the CPU 22 executes decisions in steps 61 through 65. When it is determined in step 61 that the seek track number (seek distance) to a target track is less than a preset value (e.g., 30 tracks), that is, a short seek operation needs be performed, step 63 is executed. In step 63, it is checked if the difference between a previous track position TR1 (determined in the immediately preceding positioning operation based upon the index servo data) and current track position TR2 (irrespective of whether positioning is performed by index servo data or by reading a memory) is less than a predetermined value (e.g., 30 tracks). If YES in step 63, it is checked in step 65 if the number of previous seek operations without servo data is less than a predetermined value (e.g., 100 times). If YES in step 65, the CPU 22 reads out the previous coil current (data stored in step 55) from the memory 23 in step 67 and performs positioning, in accordance with this coil current value, in step 69. At this time, positioning is performed in the above-mentioned manner, and the head 12 is reliably positioned on the target track.

When NO is obtained in any of steps 61 through 65, steps 71 through 81 are executed. That is, as described with reference to steps 53 through 57, positioning of the head is performed using servo data read out from the disk.

In the above seek operation, steps 51, 53, and 55 are executed only in the first seek operation. Therefore, after the first seek operation is performed, the following seek operations are performed from step 57.

According to experimental results obtained, conventionally, the total seek operation time is 108 msec, including an average time of 60 msec required for the head to move to the position of a target track and time required for reading servo data an average of three times (average read time 16 msec×3=48 msec). In contrast to this, according to the present invention, 48 msec for reading servo data can be substantially eliminated when positioning is performed by first referring to data stored in a memory.

What is claimed is:

1. A magnetic head control system in a magnetic disk device of an index servo system, comprising:
    a magnetic recording medium in which predetermined index servo data is prerecorded;
    a stepping motor for driving said magnetic head in order to position said magnetic head on a target track on said magnetic recording medium;
    drive signal generating means for generating both a positioning coil current value in accordance with the index servo data, and a step pulse, of said stepping motor, determined in accordance with a seek operation of said magnetic head;
    memory means for storing the positioning coil current value generated by the drive signal generating means;
    first drive control means for driving, when at least a seek distance is shorter than a preset distance in the magnetic head's seek operation, the stepping motor in a non-servo data mode in which the positioning coil current value stored in the memory means and step pulses generated by the drive signal generating means are not used; and
    second drive control means for driving, when the number of seek operations in the non-servo data mode by the first drive control means exceeds a predetermined number of magnetic head's seek operations, the stepping motor in a servo mode in which both step pulses and coil current values generated by the drive signal generating means are used.

2. A system according to claim 1, wherein said first drive control means drives, when a seek distance to a target track is less than a preset value, said stepping motor in the non-servo data mode in which the positioning coil current value stored in said memory means and the step pulse generated by said drive signal generating means are used.

3. A system according to claim 1, wherein said first drive control means drives, when a difference between a track determined in the servo mode in a previous seek operation and a current track is less than a predetermined value, said stepping motor in the nonservo data mode in which the positioning coil current value stored in said memory means and the step pulse generated by said drive signal generating means are used.

4. A system according to claim 1, wherein said first drive control means drives, when the number of previous seek operations in the non-servo mode is less than a predetermined value, said stepping motor in the non-servo data mode in which the positioning coil current value stored in said memory means and the step pulse generated by said drive signal generating means are used.

5. A system according to claim 1, wherein said first drive control means drives, when any combinations of the following conditions (A) through (C) are satisfied, said stepping motor in the non-servo data mode, using the positioning coil current value stored in said memory means and the step pulse generated by said drive signal generating means are used:
    (A) When a seek distance is shorter than a predetermined distance,
    (B) When a difference between a track determined in servo mode in a previous seek operation and a current track is less than a predetermined value; and
    (C) When the number of previous seek operations in the non-servo data mode is less than a predetermined value.

6. A system according to claim 1, wherein said second drive control means drives, when any one or number of combinations of the following conditions are satisfied, said stepping motor in a servo data mode in which the step pulse and said positioning coil current value, both of which are generated by said drive signal generating means are used:
    (A) When a seek distance is longer than a predetermined distance,
    (B) When a difference between a track determined in servo mode in a previous seek operation and a current track is more than a predetermined value; and
    (C) When the number of previous seek operations in the non-servo data mode is more than a predetermined value.

* * * * *